United States Patent
Grabowski et al.

(10) Patent No.: US 9,074,531 B2
(45) Date of Patent: Jul. 7, 2015

(54) VARIABLE AREA FAN NOZZLE FAN FLUTTER MANAGEMENT SYSTEM

(75) Inventors: Zbigniew M. Grabowski, Farmington, CT (US); Robert J. Morris, Portland, CT (US); Ray W. Carmichael, Ellington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 687 days.

(21) Appl. No.: 13/362,250

(22) Filed: Jan. 31, 2012

(65) Prior Publication Data

US 2012/0124965 A1    May 24, 2012

Related U.S. Application Data

(63) Continuation-in-part of application No. 13/350,946, filed on Jan. 16, 2012, now abandoned, which is a continuation of application No. 12/042,361, filed on Mar. 5, 2008.

(51) Int. Cl.
     *F04D 15/00*      (2006.01)
     *F02C 9/20*      (2006.01)
     *F02K 3/06*      (2006.01)

(52) U.S. Cl.
CPC ... *F02C 9/20* (2013.01); *F02K 3/06* (2013.01); *F05D 2270/10* (2013.01)

(58) Field of Classification Search
CPC .......... F02C 9/20; F02K 3/06; F05D 2270/10
USPC .................. 415/119, 146, 149.1, 30; 60/771; 239/265.39
See application file for complete search history.

(56) References Cited

U.S. PATENT DOCUMENTS

| | | | |
|---|---|---|---|
| 3,779,010 A | 12/1973 | Chamay et al. | |
| 3,820,719 A | 6/1974 | Clark | |
| 4,050,242 A * | 9/1977 | Dusa | 60/204 |
| 4,222,703 A | 9/1980 | Schaum et al. | |
| 4,327,548 A | 5/1982 | Woodward | |
| 4,782,658 A * | 11/1988 | Perry | 60/226.1 |
| 4,844,695 A | 7/1989 | Banks et al. | |
| 5,386,689 A | 2/1995 | Bozich et al. | |
| 5,524,847 A | 6/1996 | Brodell et al. | |
| 5,577,381 A | 11/1996 | Eigenbrode et al. | |
| 5,586,431 A | 12/1996 | Thonebe et al. | |
| 5,593,112 A | 1/1997 | Maier et al. | |
| 5,655,360 A | 8/1997 | Butler | |
| 5,778,659 A | 7/1998 | Duesler et al. | |
| 5,806,302 A | 9/1998 | Cariola et al. | |
| 5,853,148 A | 12/1998 | Standish et al. | |
| 5,857,321 A | 1/1999 | Rajamani et al. | |

(Continued)

FOREIGN PATENT DOCUMENTS

| | | |
|---|---|---|
| FR | 1503425 | 3/1978 |
| GB | 1503425 | 3/1978 |
| GB | 2189550 | 10/1987 |

OTHER PUBLICATIONS

International Preliminary Report on Patentability for PCT Application No. PCT/US023373 mailed Aug. 14, 2014.

*Primary Examiner* — Liam McDowell
(74) *Attorney, Agent, or Firm* — Carlson, Gaskey & Olds P.C.

(57) ABSTRACT

A gas turbine engine includes a controller that controls a fan blade flutter characteristic through control of a variable area fan nozzle.

19 Claims, 7 Drawing Sheets

(56) References Cited

U.S. PATENT DOCUMENTS

| | | |
|---|---|---|
| 6,459,963 B1 | 10/2002 | Bennett et al. |
| 6,493,689 B2 | 12/2002 | Kotouslas et al. |
| 6,582,183 B2 | 6/2003 | Eveker et al. |
| 6,751,602 B2 | 6/2004 | Kotoulas et al. |
| 6,751,944 B2 * | 6/2004 | Lair ............... 60/226.3 |
| 6,786,642 B2 | 9/2004 | Dubreuil et al. |
| 6,810,718 B2 | 11/2004 | Wilson et al. |
| 6,823,675 B2 | 11/2004 | Brunell et al. |
| 6,892,127 B2 | 5/2005 | Wiseman |
| 7,065,468 B2 | 6/2006 | Wiseman |
| 7,097,414 B2 | 8/2006 | Stangeland |
| 7,216,071 B2 | 5/2007 | Volponi |
| 7,328,128 B2 | 2/2008 | Bonanni et al. |
| 7,721,549 B2 | 5/2010 | Baran |
| 7,725,293 B2 | 5/2010 | Bonissone et al. |
| 2006/0101807 A1 | 5/2006 | Wood et al. |
| 2007/0084211 A1 | 4/2007 | Bowman et al. |
| 2007/0245738 A1 * | 10/2007 | Stretton et al. .............. 60/728 |
| 2009/0226303 A1 | 9/2009 | Grabowski et al. |
| 2010/0043390 A1 | 2/2010 | Jain et al. |
| 2010/0107600 A1 | 5/2010 | Hillel et al. |
| 2010/0229528 A1 | 9/2010 | Ramlaoui et al. |
| 2014/0000279 A1 * | 1/2014 | Brousseau et al. ........... 60/782 |

* cited by examiner

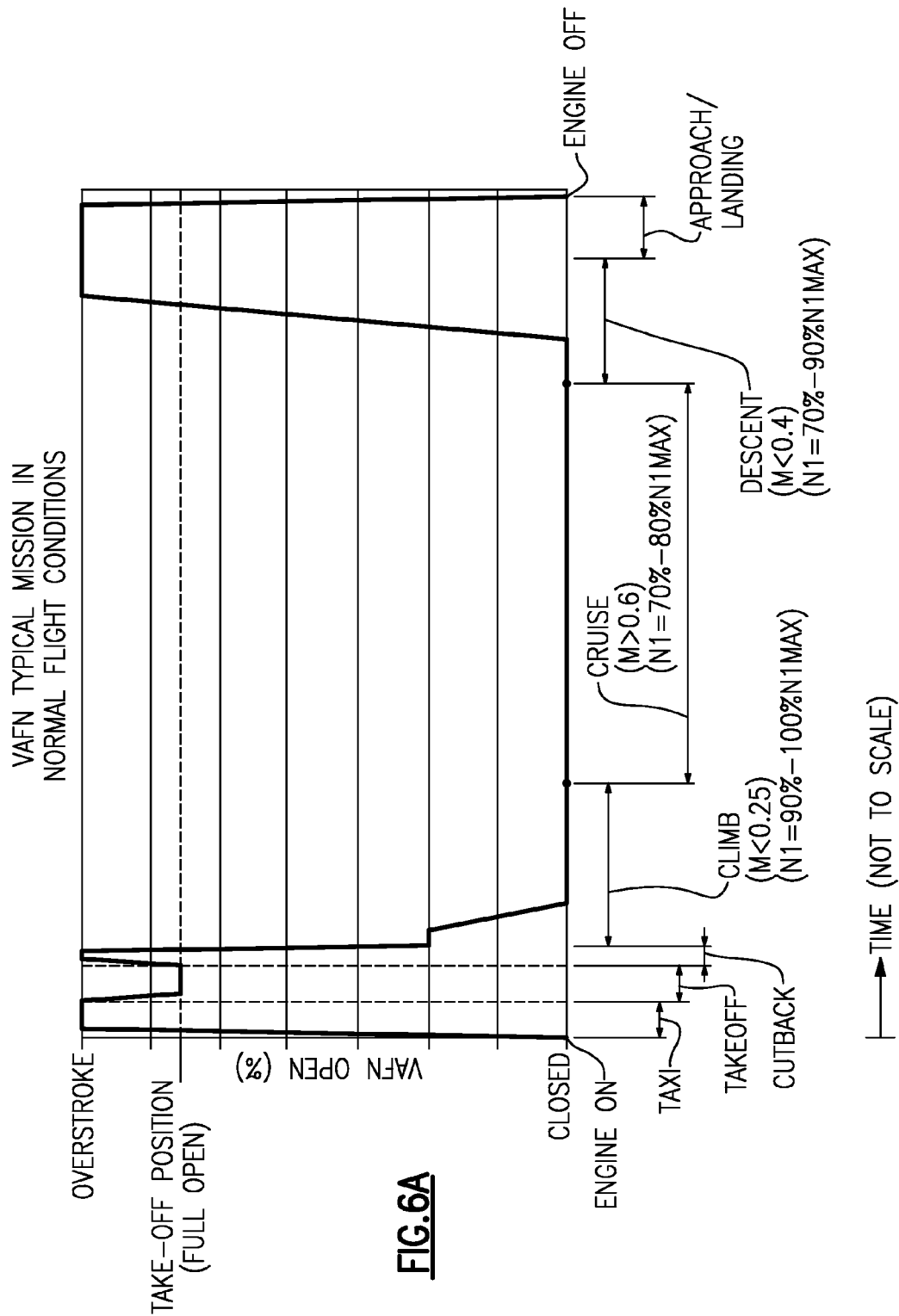

VARIABLE AREA FAN NOZZLE FAN FLUTTER MANAGEMENT SYSTEM

RELATED APPLICATIONS

This application is a continuation-in-part of U.S. application Ser. No. 13/350,946, filed 16 Jan. 2012, now abandoned which is a continuation of U.S. application Ser. No. 12/042,361, filed 5 Mar. 2008.

BACKGROUND

Conventional gas turbine engines include a fan section driven by a core engine. Combustion gases are discharged from the core engine along a primary airflow path and are exhausted through a core exhaust nozzle. Pressurized fan air is discharged through an annular fan nozzle defined at least partially by a fan nacelle and a core nacelle. A majority of propulsion thrust is provided by the pressurized fan air discharged through the fan nozzle, the remainder of the thrust provided from the combustion gases discharged through the core exhaust nozzle.

Fan nozzles of conventional gas turbine engines have fixed geometry. Fixed geometry fan nozzles are a compromise suitable for take-off and landing conditions as well as for cruise conditions as the requirements for take-off and landing conditions are different from requirements for a cruise condition. Some gas turbine engines have implemented fan variable area nozzles. The fan variable area nozzle provides a smaller fan exit nozzle diameter during cruise conditions and a larger fan exit nozzle diameter during take-off and landing conditions to optimize operation at each condition.

Although low pressure ratio turbofans provide high propulsive efficiency low pressure ratio turbofans may be susceptible to fan stability/flutter at low power and low flight speeds. Fan blade flutter signature and flutter boundary management characteristics may change over the life of the engine thereby complicating compensation of the fan stability/flutter issue.

SUMMARY

A gas turbine engine for an aircraft according to an exemplary aspect of the present disclosure includes, among other things, a core engine defined about an axis, a fan driven by the core engine about the axis, a core nacelle defined at least partially about the core engine, and a fan nacelle defined around the fan and at least partially around the core nacelle. Further included is a variable area fan nozzle (VAFN) to define a fan exit area downstream of the fan between the fan nacelle and the core nacelle. A controller is further included, and is operable to control a fan blade flutter characteristic through control of the VAFN, the controller adjusting the VAFN based on at least one of an aircraft Mach number (M) and a low spool rotational speed (N1).

In a further non-limiting embodiment of the foregoing engine, the VAFN may is opened during aircraft take-off.

In a further non-limiting embodiment of either of the foregoing engines, the VAFN moves from fully open to fully closed during an aircraft climb.

In a further non-limiting embodiment of any of the foregoing engines, the VAFN moves from fully open to fully closed when M is less than about 0.25 and N1 is within a range of about 90%-100% of a maximum N1 (N1MAX).

In a further non-limiting embodiment of any of the foregoing engines, the VAFN moves from fully open to fully closed within about 7 minutes.

In a further non-limiting embodiment of any of the foregoing engines, the VAFN is fully closed during an aircraft cruise.

In a further non-limiting embodiment of any of the foregoing engines, the VAFN is fully closed when M is greater than about 0.6 and N1 is within a range of about 70% to about 80% of a maximum N1 (N1MAX).

In a further non-limiting embodiment of any of the foregoing engines, the VAFN moves from fully closed to fully open during an aircraft descent.

In a further non-limiting embodiment of any of the foregoing engines, the VAFN moves from fully closed to fully open when M1 is less than about 0.4 and N1 is within a range of about 70% to about 90% of a maximum N1 (N1MAX).

In a further non-limiting embodiment of any of the foregoing engines, the controller is operable to determine possible changes in the fan blade flutter boundary.

In a further non-limiting embodiment of any of the foregoing engines, the controller is operable to detect changes in the fan blade flutter boundary caused by changes in components of the engine, and changes to operating conditions.

In a further non-limiting embodiment of any of the foregoing engines, further included is a fan and a gear train, wherein the gear train reduces the rotational speed of the fan relative to a shaft of the gas turbine engine, the shaft rotatably coupled to a low pressure compressor of the engine.

In a further non-limiting embodiment of any of the foregoing engines, the gear train provides a gear reduction ratio of greater than or equal to about 2.5.

In a further non-limiting embodiment of any of the foregoing engines, further including a low pressure turbine, the low pressure turbine providing a pressure ratio that is greater than about five (5).

In a further non-limiting embodiment of any of the foregoing engines, a bypass flow path is defined between the core nacelle and the fan nacelle, the bypass flow defines a bypass ratio greater than about ten (10).

Another gas turbine engine for an aircraft according to an exemplary aspect of the present disclosure includes, among other things, a core engine defined about an axis, a fan driven by the core engine about the axis, a core nacelle defined at least partially about the core engine, and a fan nacelle defined around the fan and at least partially around the core nacelle. Further included is a variable area fan nozzle (VAFN) to define a fan exit area downstream of the fan between the fan nacelle and the core nacelle. A controller is further operable to control a fan blade flutter characteristic through control of the VAFN, the controller adjusting the VAFN based on one of at least two operating schedules, wherein the at least two operating schedules includes a normal flight conditions schedule and an icing flight conditions schedule.

In a further non-limiting embodiment of the foregoing engine the VAFN includes a first component movable relative to the fan nacelle.

In a further non-limiting embodiment of either of the foregoing engines, the first component is one of a flap and a cowl.

In a further non-limiting embodiment of any of the foregoing engines, when the controller adjusts the VAFN based on the normal flight conditions schedule, the VAFN is open during an aircraft take-off, an aircraft climb, an aircraft descent, and an aircraft approach, and the VAFN is fully closed during an aircraft cruise.

In a further non-limiting embodiment of any of the foregoing engines, when the controller adjusts the VAFN based on the icing flight conditions schedule, the VAFN is at least partially open during an aircraft takeoff, and the VAFN is fully closed during an aircraft climb, an aircraft cruise, an aircraft descent, and an aircraft approach.

These and other features of the present disclosure can be best understood from the following drawings and detailed description.

DRAWINGS

The drawings can be briefly described as follows:

FIG. 6A is a graphical representation of an exemplary VAFN control schedule during normal flight conditions.

DETAILED DESCRIPTION

Figure 1:
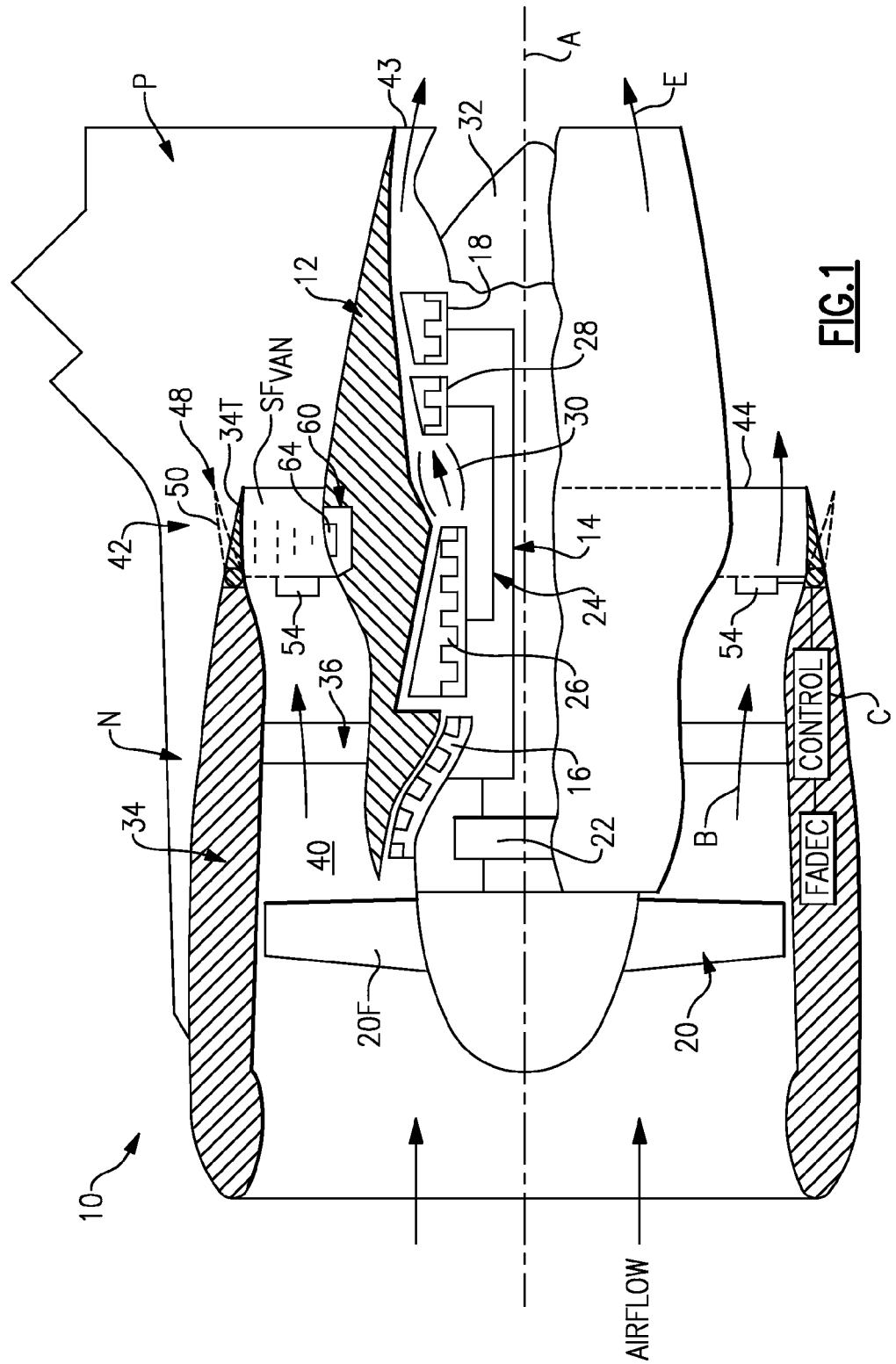
FIG. 1 is a general schematic partial fragmentary view of an exemplary gas turbine engine embodiment for use with the present invention.

FIG. 1 illustrates a general partial fragmentary schematic view of a gas turbine engine 10 suspended from an engine pylon P within an engine nacelle assembly N as is typical of an aircraft designed for subsonic operation.

The engine 10 includes a core engine within a core nacelle 12 that at least partially houses a low pressure spool 14 and high pressure spool 24. The low pressure spool 14 includes a low pressure compressor 16 and low pressure turbine 18. The low pressure spool 14 drives a fan section 20 directly or through a gear system 22. The high pressure spool 24 includes a high pressure compressor 26 and high pressure turbine 28. A combustor 30 is arranged between the high pressure compressor 26 and high pressure turbine 28. The low pressure and high pressure spools 14, 24 rotate about an engine axis of rotation A.

The engine 10 in one non-limiting embodiment is a high-bypass geared architecture aircraft engine with a bypass ratio greater than about ten (10:1), a turbofan diameter significantly larger than that of the low pressure compressor 16, and a low pressure turbine pressure ratio greater than about 5:1. The gear system 22 may be an epicycle gear train such as a planetary gear system or other gear system with a gear reduction ratio of greater than about 2.5:1. It should be understood, however, that the above parameters are only exemplary of one non-limiting embodiment of a geared architecture engine and that the present invention is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation through spools 24, 14 to rotationally drive the compressors 26, 16 and the fan section 20 in response to the expansion. A core engine exhaust E exits the core nacelle 12 through a core nozzle 43 defined between the core nacelle 12 and a tail cone 32.

The core nacelle 12 is at least partially supported within the fan nacelle 34 by structure 36 often generically referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B is communicated through the generally annular bypass flow path 40 and is discharged from the engine 10 through a variable area fan nozzle (VAFN) 42 which defines a nozzle exit area 44 between the fan nacelle 34 and the core nacelle 12 adjacent to an end segment 34T of the fan nacelle 34 downstream of the fan section 20.

A significant amount of thrust is provided by the bypass flow B due to the high bypass ratio. The fan section 20 of the engine 10 may, in one non-limiting embodiment, be designed for a particular flight condition—typically cruise at 0.8M and 35,000 feet. The VAFN 42 defines a nominal converged cruise position for the fan nozzle exit area 44 and radially opens relative thereto to define a diverged position for other flight conditions. The VAFN 42, in one non-limiting embodiment, provides an approximately 20% (twenty percent) change in the fan exit nozzle area 44. It should be understood that other arrangements as well as essentially infinite intermediate positions as well as thrust vectored positions in which some circumferential sectors of the VAFN 42 are converged or diverged relative to other circumferential sectors are likewise usable with the present invention.

As the fan blades 20F within the fan section 20 are efficiently designed at a particular fixed stagger angle for an efficient cruise condition, the VAFN 42 is operated to effectively vary the fan nozzle exit area 44 to adjust fan bypass flow such that the angle of attack or incidence on the fan blades 20F is maintained close to the design incidence for efficient engine operation at other flight conditions, such as landing and takeoff to thus provide optimized engine operation over a range of flight conditions with respect to performance and other operational parameters such as noise levels.

The VAFN 42 generally includes a flap assembly 48 which varies the fan nozzle exit area 44. The flap assembly 48 may be incorporated into the end segment 34T of fan nacelle 34 to include a trailing edge thereof. The flap assembly 48 generally includes a multiple of VAFN flaps 50, a respective multiple of flap linkages 52 and an actuator system 54 (also illustrated in FIG. 2). It should be understood that although VAFN flaps 50 are illustrated in the disclosed embodiment, other VAFN 42 systems which vary the fan nozzle exit area 44 are likewise usable with the present invention. While flaps are shown, the VAFN could alternatively include a cowl assembly, provided in part by one or more cowls, that is configured to move axially relative to the fan nacelle 34.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a VAFN controller C. The VAFN controller C may include a processing module, such as a microprocessor and a memory device in communication therewith to operate the actuator system 54.

Low pressure ratio turbofans are desirable for their high propulsive efficiency. However, low pressure ratio fans may be inherently susceptible to fan stability/flutter issues at low power and low flight speeds. The VAFN 42 allows the engine 10 to shift to a more favorable fan operating line at low power to avoid the instability region, yet provide a relatively smaller nozzle area necessary to shift to a high-efficiency fan operating line at a cruise condition.

Figure 2:
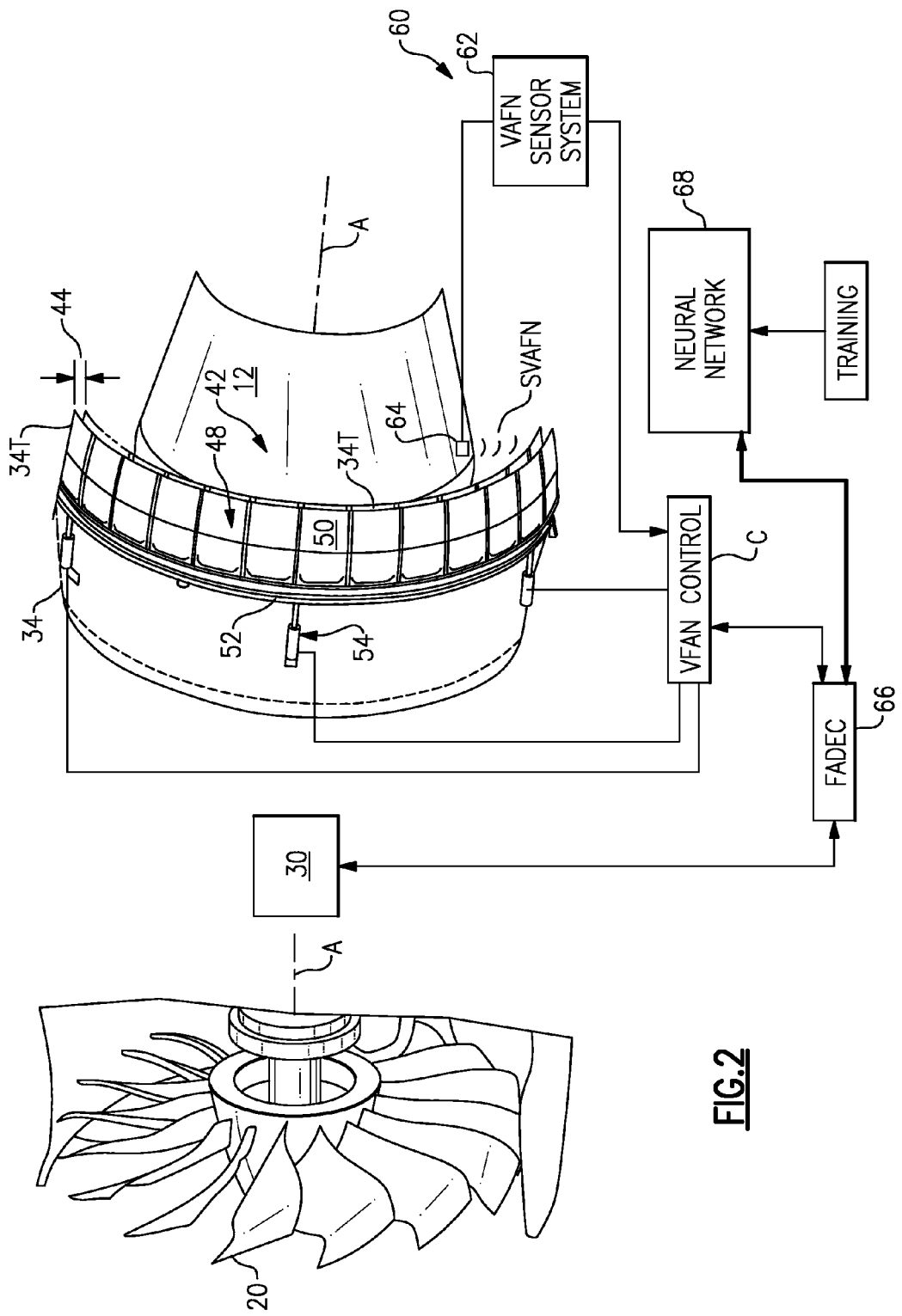
FIG. 2 is a general schematic view of a control system with neural network support for a gas turbine engine.

Referring to FIG. 2, the position of the VAFN 42 is determined by a positional measurement system 60. The positional measurement system 60 remotely senses the position of the VAFN flaps 50 through, in one non-limiting embodiment, a VAFN sensor system 62. The VAFN sensor system 62 remotely measures the position of the VAFN flaps 50 through a signal Svafn which reflects off of the VAFN flap 50 to measure their actual position relative the core nacelle 12. The VAFN sensor system 62 in one non-limiting embodiment, includes a transceiver 64 located within the core nacelle 12 to a direct the signal Svafn in a radial direction toward the VAFN flaps 50. The signals Svafn, may include various signals or combinations of signals including microwave, radio, optical, laser, or the like. It should be understood that the positional measurement system 60 may alternatively or additionally include other systems to determine the position of the VAFN 42.

The VAFN controller C communicates with an engine controller such as a Full Authority Digital Engine Control (FADEC) 66 which also controls fuel flow to the combustor 30. It should be understood that the FADEC 66 may communicate with a higher level controller such as flight control computer, or such like. The VAFN controller C determines and controls the position of the VAFN 42 in response to the FADEC 66. The FADEC is trimmed by the Neural Network (NN) 68 which has been trained so as to compensate for a fan blade flutter characteristic. That is, FADEC trim is adjusted by the neural network NN.

Figure 3:
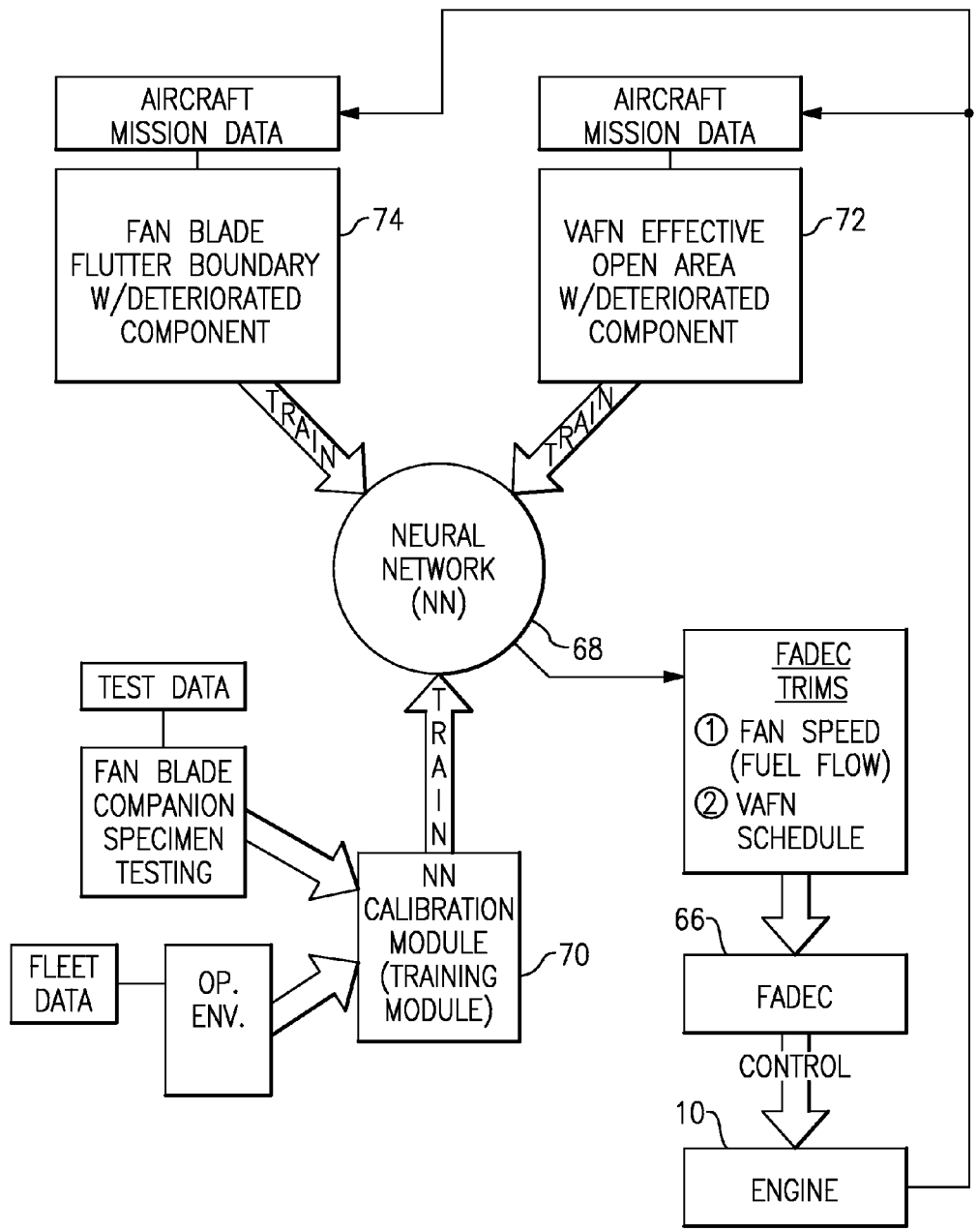
FIG. 3 is a block diagram illustrating training of a neural network and trimming of a FADEC.

Referring to FIG. 3, the training of the neural network NN may be, in one non-limiting embodiment, generated by aircraft mission data, fan blade companion testing, VAFN fleet data, as well as other inputs. A calibration module 70 is utilized to train the neural network 68 with a baseline expected deterioration profile validated and updated by serial number specific in-flight aircraft mission data from each specific engine. That is, the neural network NN is trained to the specifics of each engine through the combination of serial number specific data for that engine, test data, of fleet data, as well as other data.

The neural network 68 training input utilizes test data to determine a baseline expected deterioration profile. Such test data may be determined through companion specimen tests and fleet data which is communicated to the calibration module 70 for incorporation into the neural network 68.

Companion specimen tests may include testing of fan blades and/or other engine components to determine the baseline expected deterioration profile. The fleet data may further modify the baseline expected deterioration profile due to, for example only, the expected fleet operating environment of which the particular engine is part. That is, engines from a fleet expected to operate primarily in a relatively cold environment may have one type of baseline modification while engines which are expected to operate primarily in a relatively hot environment may have a different type of baseline modification specific thereto.

Aircraft mission data is serial number specific in-flight operational data obtained from each engine for incorporation into the neural network NN. Serial number specific data may be incorporated into the neural network NN to tailor the FADEC to each specific engine. The aircraft mission data may include, in one non-limiting embodiment, VAFN effective open area with a deterioration component 72 and fan blade flutter boundary with a deterioration component 74 to describe component operational differences between each engine. That is, each engine may deteriorate or change differently over time such that neural network NN is trained for operation of the particular engine.

Figure 4:
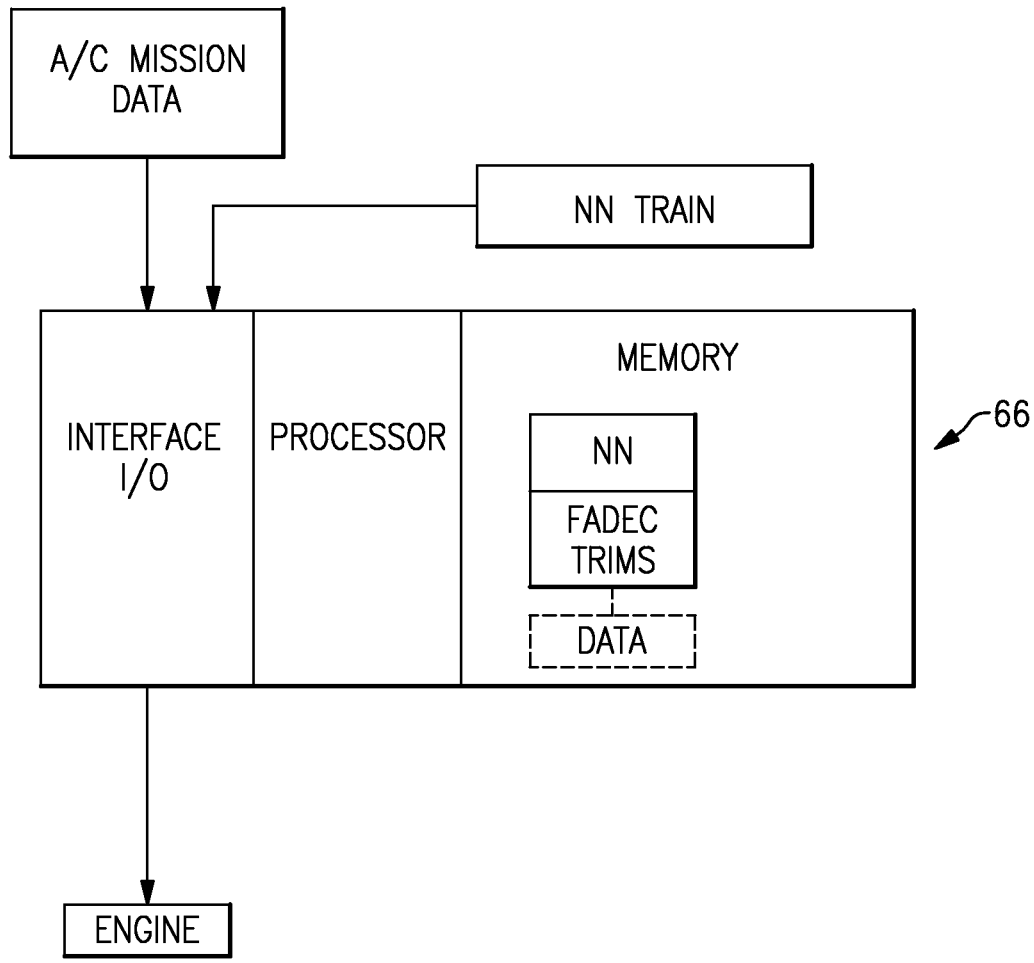
FIG. 4 is a general schematic view of a FADEC.

The FADEC 66, in one non-limiting embodiment, includes a processing module, a memory device and an interface for communication with engine systems and other components (FIG. 4). The processing module may include a microprocessor and the memory device may include RAM, ROM, electronic, optical, magnetic, or other computer readable medium onto which is stored, for example only, the FADEC trims, the neural network NN as well as other data such as that graphically illustrated in FIG. 5. It should be understood that the neural network NN may be stored within the FADEC 66 or may be a separate module.

Figure 5:
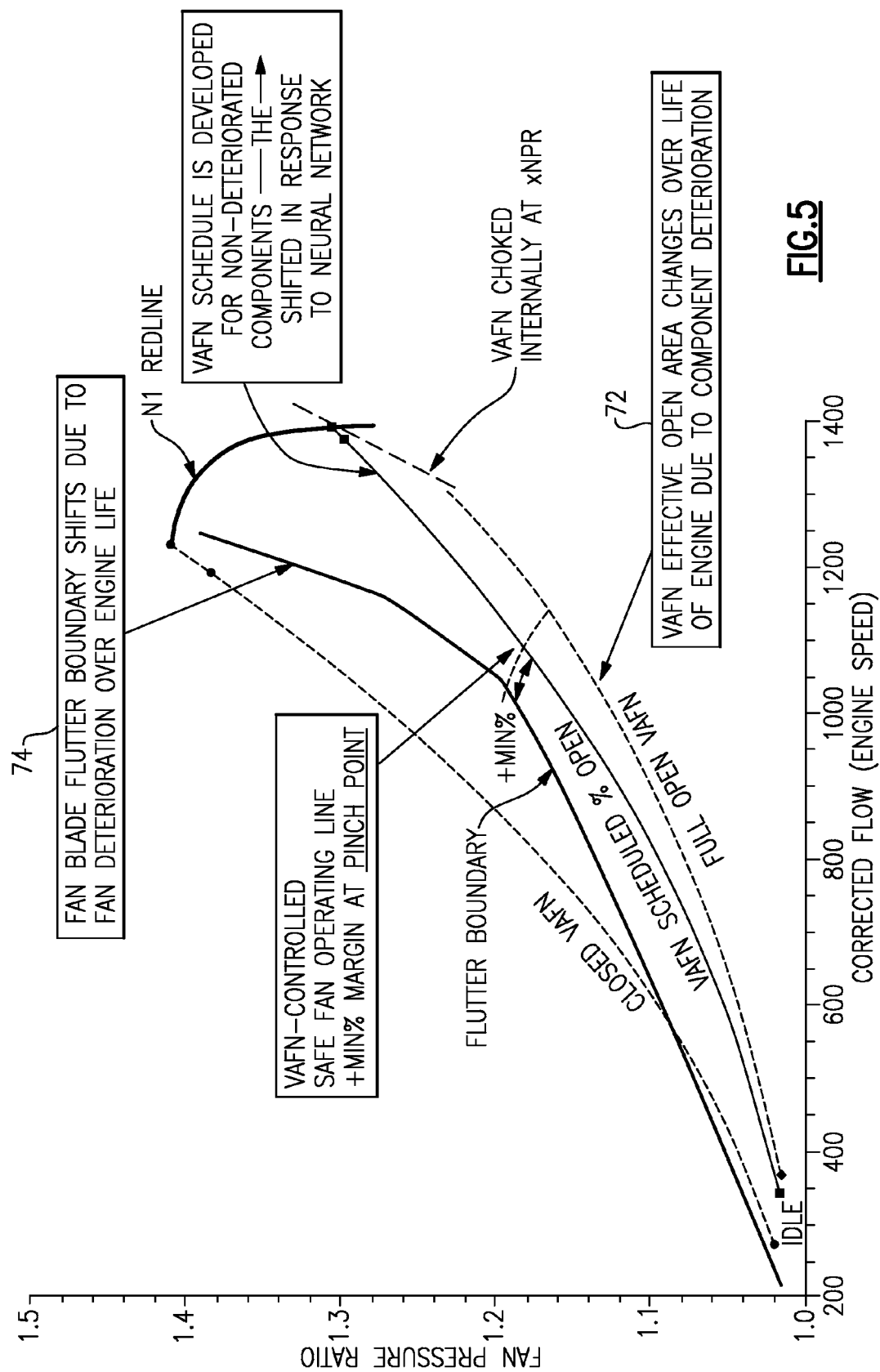
FIG. 5 is a graphical representation of a flutter boundary relative to a VAFN opening schedule.

Once trained, the neural network NN determines the FADEC trims to compensate for component deterioration and other operations then updates the FADEC. The FADEC schedules the percent open of the VAFN 42 (VAFN schedule; FIG. 5) and/or adjusts the speed of the blades 20F through fuel flow control to the combustor 30 (FIG. 2). The FADEC thereby provides fan flutter/instability boundary management in response to the neural network NN to compensate for component deterioration. The neural network NN may also be retrained at period intervals with updated aircraft mission data and updated test data.

Referring to FIG. 5, a graphical representation of the fan blade flutter boundary relative to the VAFN schedule is illustrated in graphical form. Over time, the fan blade flutter boundary and fully open VAFN boundary will shift in response to component deterioration. The VAFN schedule is initially determined for a baseline operation of the VAFN 42. As the fan blade flutter boundary and fully open VAFN boundary shifts do to deterioration or other operating conditions, the neural network NN will determine appropriate FADEC trims, update the FADEC and shift the VAFN schedule to maintain efficient engine operation yet avoid fan flutter/instability.

Figure 6B:
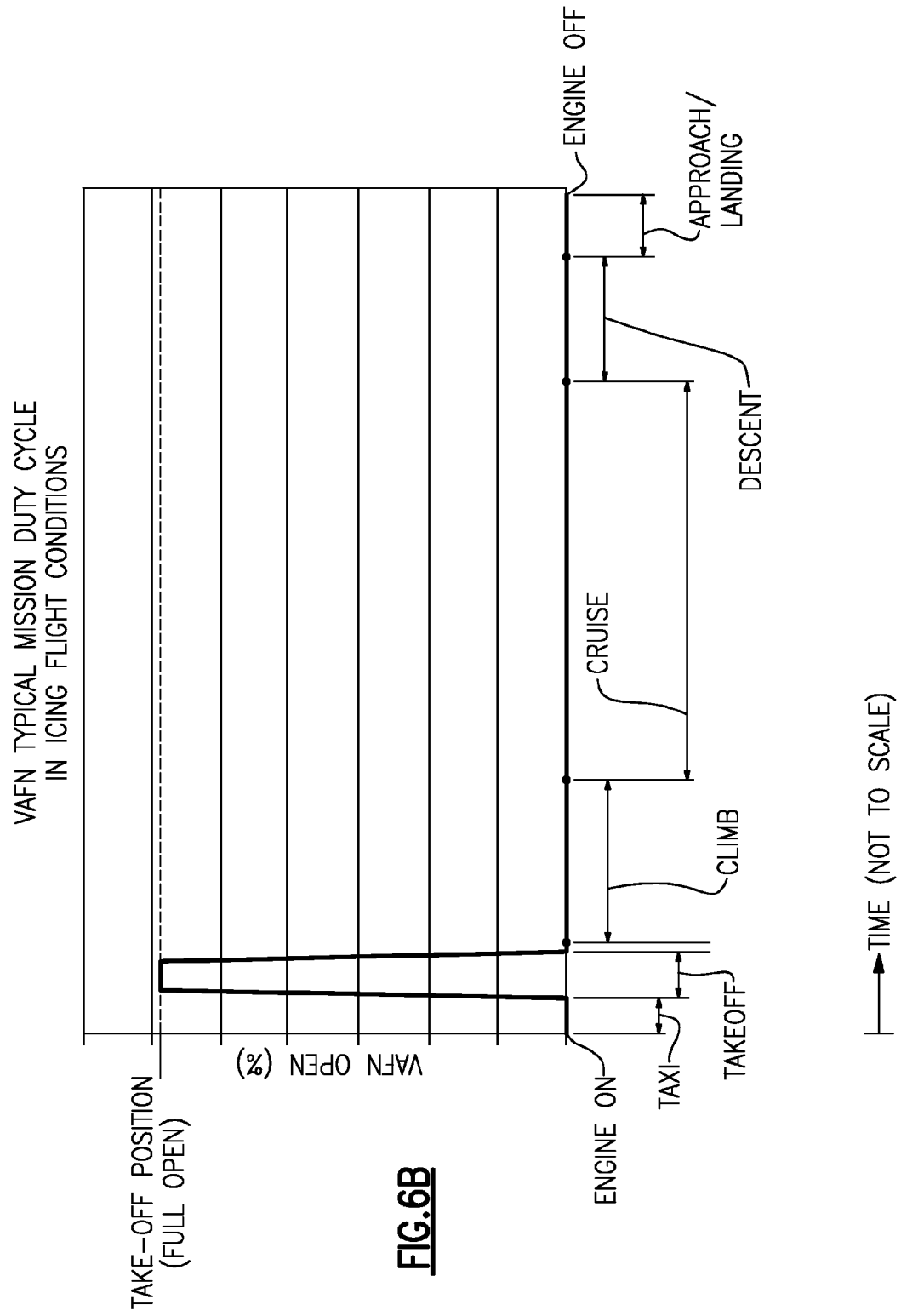
FIG. 6B is a graphical representation of an exemplary VAFN control schedule during icing flight conditions.

FIGS. 6A-6B illustrate example control schedules for the VAFN 42, in which the VAFN controller C adjusts the VAFN 42 based on at least one of Mach number (M), or aircraft speed relative to the speed of sound, and low spool rotational speed (N1). An absolute Mach number (M) could be considered by the VAFN controller C, or the VAFN controller C could consider Mach number (M) as a relationship to dynamic total air pressure on the aircraft or the engine. Further, reference to N1 can include a "corrected" N1 (e.g., N1 corrected for certain thermodynamic parameters) and, alternatively, an absolute RPM measurement of the low spool rotational speed.

Notably, while the above-discussed control method includes the neural network NN, the control schedules of FIG. 6A-6B can be practiced without the neural network NN, by either or both of the VAFN controller C and the FADEC 66.

As generally explained above, the VAFN controller C (either alone, or under instruction from the FADEC 66) adjusts the VAFN 42 such that the fan blades are in a safe flutter regime, while maintaining a proper engine thrust. The VAFN 42 control schedules of FIGS. 6A-6B are representative of schemes where there are normal flight conditions (or, non-icing flight conditions), and icing flight conditions, respectively.

Turning first to FIG. 6A, a normal flight conditions VAFN 42 control schedule is shown with VAFN 42 open percentage on the Y-Axis, and time on the X-axis. Also shown on the X-axis are the stages of an aircraft flight profile. In the example shown, these stages (e.g., taxi, take-off, cutback, climb, etc.) correspond to certain Mach number (M) and low spool rotational speed (N1) combinations.

Initially, after engine start-up, the VAFN 42 may be opened to either a fully open position, or an overstroke position. The overstroke position exceeds the fully open position, and may provide additional acoustic advantages (such as sound dampening) beyond the advantage of reducing the potential for the onset of fan blade flutter. Notably, the VAFN 42 need not open to the overstroke position, and instead the fully open position can be used. During take-off, the VAFN 42 is adjusted to a take-off position (e.g., shown as the fully open position), effectively increasing a fan nacelle exit area by approximately 14%-16% relative to when the VAFN is in the fully closed position. After take-off, the aircraft may enter a cut-back stage of the flight profile, and the VAFN 42 can optionally be moved to an overstroke position, as shown, or can remain at the take-off position.

During aircraft climb, the VAFN 42 moves from the fully open position to the fully closed position. In the example shown, this occurs within 7 about minutes of entering the climb stage of the flight profile. In another example, the time it takes to move from the fully open position to the closed position is within approximately 30% of the overall time spent in the climb profile. During an example climb, Mach number M is less than about 0.25 and N1 is within a range of about 90%-100% of $N1_{MAX}$, or a maximum low spool rotational shaft speed. In particular, this $N1_{MAX}$ is the low spool rotational shaft speed at which the engine produces its rated thrust. In another example, Mach number M is greater than 0.4 and N1 is within the same range, of about 90%-100% of $N1_{MAX}$.

During cruise, in which M is greater than 0.6 and N1 is within a range of about 70% to about 80% of $N1_{MAX}$, the VAFN 42 is fully closed. In one example, M is approximately 0.8 during cruise. Once the aircraft enters the descent section of its profile, the VAFN 42 is then re-opened. In the example descent profile, M is less than about 0.4 and N1 is within a range of about 70% to about 90% of $N1_{MAX}$, and the VAFN 42 moves from fully closed to the overstroke position within about 6 minutes. In another example descent profile, M is less than 0.8 with the same N1 range (e.g., within about 70%-90% of $N1_{MAX}$). Again, instead of the overstroke position, the VAFN 42 could be moved to the fully open position during descent. In other examples, the VAFN 42 could move from fully closed to either the fully open or overstroke positions within a time that is approximately 33% of the total time spent in the descent profile.

Finally, during approach and landing, the VAFN 42 is either in the overstroke position, as shown, or in the fully open position, essentially until the engine is powered down.

In the example of FIG. 6B, the VAFN controller C controls the VAFN 42 in a manner different from the schedule of FIG. 6A to account for icing flight conditions. Icing flight conditions may be detected based on readings from sensors that either detect actual ice build-up, or conditions indicating the potential for ice build-up. For example, a temperature reading of below 0° C. (32° F.) could indicate icing flight conditions.

Essentially, when icing flight conditions are present, ice accretion and build-up on the VAFN 42 is to be avoided to the extent possible. This is, in part, due to the potential for a leading edge of the VAFN 42 to accrete and accumulate ice (especially in the case that the VAFN 42 includes one or more cowls), which in turn can prevent the VAFN 42 from closing. Further, ice accretion and accumulation on the VAFN 42 can disturb air flow, and change air flow shape and speed characteristics, leading to unexpected and potentially undesirable operating conditions.

Accordingly, opening of the VAFN 42 should be limited during these icing flight conditions. In the example of FIG. 6B, the benefit from the use of the VAFN 42 was deemed to outweigh the risk of ice accumulation during aircraft take-off only. That is, during take-off, the VAFN 42 was opened to the take-off position, and during the other stages of the flight profile (e.g., cruise, descent, approach/landing) the VAFN 42 remains in the fully closed position.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this invention are not limited to those particular combinations. It is possible to use some of the components or features from one of the examples in combination with features or components from another one of the examples. Further, while particular step sequences are shown, described, and claimed, it should be understood that steps may be performed in any order, separated or combined unless otherwise indicated and will still benefit from the present invention.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine for an aircraft, comprising:
a core engine defined about an axis;
a fan driven by said core engine about said axis;
a core nacelle defined at least partially about said core engine;
a fan nacelle defined around said fan and at least partially around said core nacelle;
a variable area fan nozzle (VAFN) to define a fan exit area downstream of said fan between said fan nacelle and said core nacelle; and
a controller operable to control a fan blade flutter characteristic through control of said VAFN, said controller adjusting said VAFN based on at least one of an aircraft Mach number (M) and a low spool rotational speed (N1), said controller adjusting said VAFN based on one of at least two operating schedules, wherein said at least two operating schedules includes a normal flight conditions schedule and an icing flight conditions schedule, wherein, when in said icing flight conditions schedule, said controller limits operation of said VAFN relative to said normal flight conditions schedule such that said VAFN is instructed to be fully closed for an entirety of a first number of flight stages in said normal operating conditions flight schedule and a second number of flight stages in said icing flight conditions schedule, the second number of flight stages greater than the first number of flight stages.

2. The engine as recited in claim 1, wherein said VAFN is opened during aircraft take-off.

3. The engine as recited in claim 1, wherein, during an aircraft climb, said VAFN moves from fully open to fully closed.

4. The engine as recited in claim 3, wherein said VAFN moves from fully open to fully closed when M is less than about 0.25 and N1 is within a range of about 90%-100% of a maximum N1 ($N1_{MAX}$).

5. The engine as recited in claim 4, wherein said VAFN moves from fully open to fully closed within about 7 minutes.

6. The engine as recited in claim 1, wherein, during an aircraft cruise, said VAFN is fully closed.

7. The engine as recited in claim 6, wherein said VAFN is fully closed when M is greater than about 0.6 and N1 is within a range of about 70% to about 80% of a maximum N1 ($N1_{MAX}$).

8. The engine as recited in claim 1, wherein, during an aircraft descent, said VAFN moves from fully closed to fully open.

9. The engine as recited in claim 8, wherein said VAFN moves from fully closed to fully open when M is less than about 0.4 and N1 is within a range of about 70% to about 90% of a maximum N1 ($N1_{MAX}$).

10. The engine as recited in claim 1, wherein said controller is operable to determine possible changes in said fan blade flutter boundary.

11. The engine as recited in claim 10, wherein said controller is operable to detect changes in said fan blade flutter boundary caused by changes in components of said engine, and changes to operating conditions.

12. The engine as recited in claim 1, including a fan and a gear train, wherein the gear train reduces the rotational speed of the fan relative to a shaft of the gas turbine engine, the shaft rotatably coupled to a low pressure compressor of the engine.

13. The engine as recited in claim 1, wherein a bypass flow path is defined between said core nacelle and said fan nacelle, said bypass flow defines a bypass ratio greater than about ten (10).

14. The engine as recited in claim 1, wherein:
when said controller adjusts said VAFN based on said normal flight conditions schedule, said VAFN is open during an aircraft take-off, an aircraft climb, an aircraft descent, and an aircraft approach, and said VAFN is fully closed during the entirety of an aircraft cruise; and
when said controller adjusts said VAFN based on said icing flight conditions schedule, said VAFN is at least partially open during an aircraft takeoff, and said VAFN is fully closed during the entirety of an aircraft climb, an aircraft cruise, an aircraft descent, and an aircraft approach.

15. A gas turbine engine for an aircraft, comprising:
a core engine defined about an axis;
a fan driven by said core engine about said axis;
a core nacelle defined at least partially about said core engine;
a fan nacelle defined around said fan and at least partially around said core nacelle;
a variable area fan nozzle (VAFN) to define a fan exit area downstream of said fan between said fan nacelle and said core nacelle; and
a controller operable to control a fan blade flutter characteristic through control of said VAFN, said controller adjusting said VAFN based on one of at least two operating schedules, wherein said at least two operating schedules includes a normal flight conditions schedule and an icing flight conditions schedule, wherein, when in said icing flight conditions schedule, said controller limits operation of said VAFN relative to said normal flight conditions schedule such that such that said VAFN is instructed to be fully closed for an entirety of a first number of flight stages in said normal operating conditions flight schedule and a second number of flight stages in said icing flight conditions schedule, the second number of flight stages greater than the first number of flight stages.

16. The engine as recited in claim 15, wherein said VAFN includes a first component movable relative to said fan nacelle.

17. The engine as recited in claim 16, wherein said first component is one of a flap and a cowl.

18. The engine as recited in claim 15, wherein, when said controller adjusts said VAFN based on said normal flight conditions schedule, said VAFN is open during an aircraft take-off, an aircraft climb, an aircraft descent, and an aircraft approach, and said VAFN is fully closed during an entirety of an aircraft cruise.

19. The engine as recited in claim 18, wherein, when said controller adjusts said VAFN based on said icing flight conditions schedule, said VAFN is at least partially open during an aircraft takeoff, and said VAFN is fully closed during an entirety of an aircraft climb, an aircraft cruise, an aircraft descent, and an aircraft approach.

* * * * *